G. HOWELL.
Reclaiming Low Land.
No. 221,822. Patented Nov. 18, 1879.
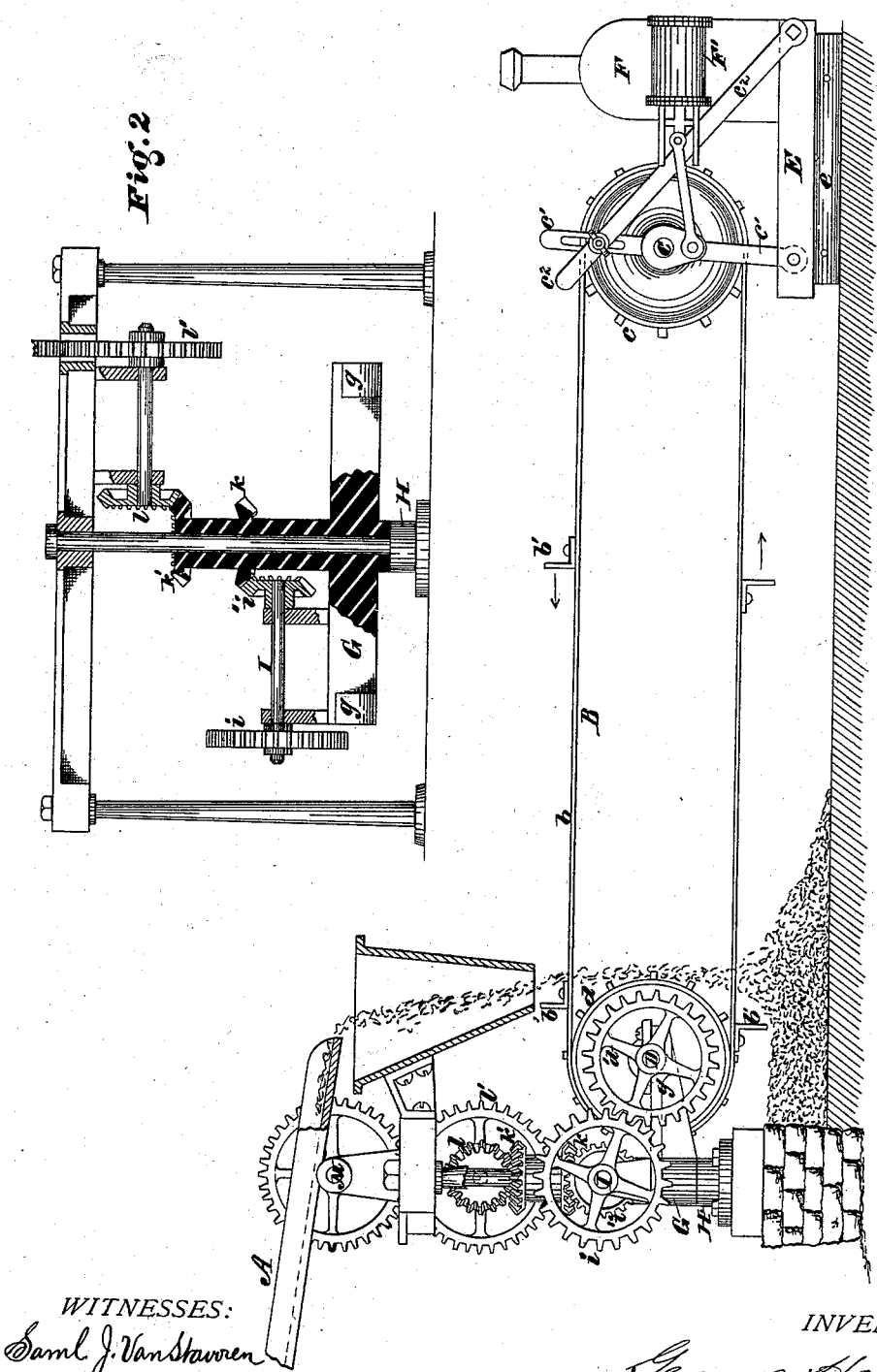

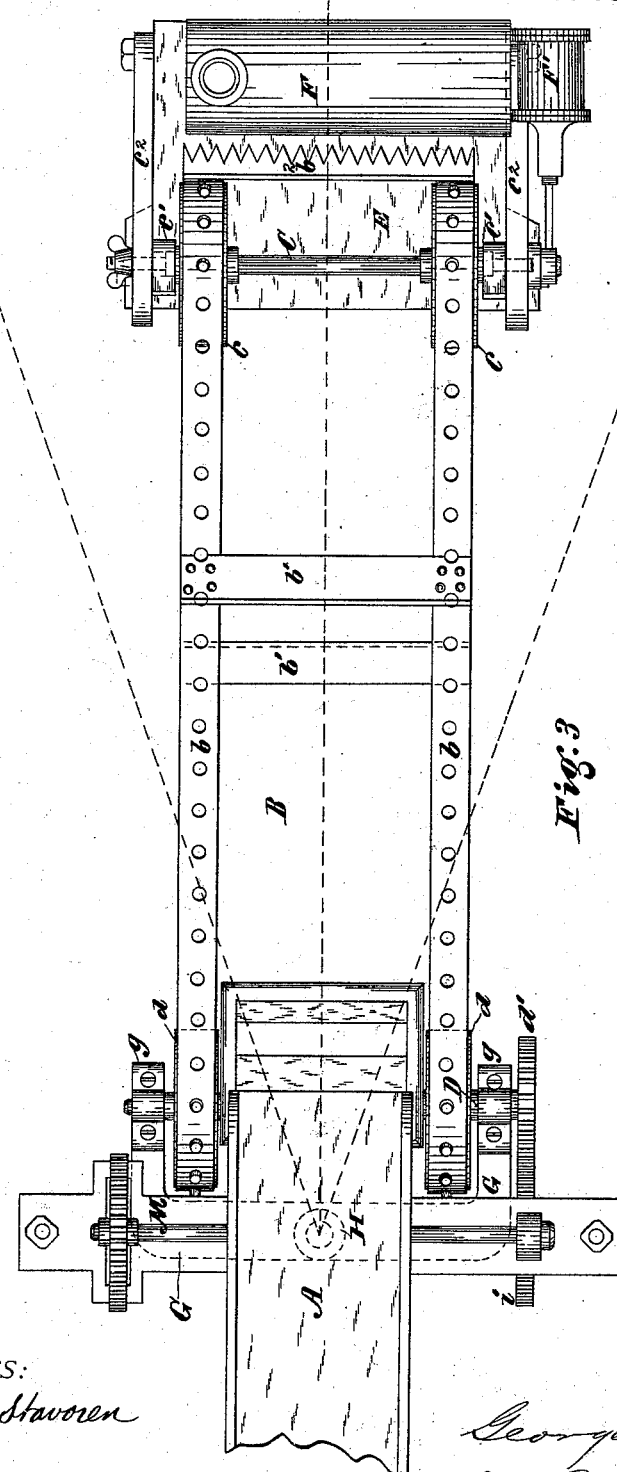

UNITED STATES PATENT OFFICE.

GEORGE HOWELL, OF PHILADELPHIA, PENNSYLVANIA.

IMPROVEMENT IN RECLAIMING LOW LANDS.

Specification forming part of Letters Patent No. 221,822, dated November 18, 1879; application filed June 17, 1879.

*To all whom it may concern:*

Be it known that I, GEORGE HOWELL, of Philadelphia, in the county of Philadelphia and State of Pennsylvania, have invented certain new and useful Improvements in Appliances for Filling in or Reclaiming Low or Waste Lands; and I do hereby declare the following to be a full, clear, and exact description of the invention, such as will enable others skilled in the art to which it pertains to make and use it, reference being had to the accompanying drawings, which form a part of this specification, in which—

Figure 1 is a side elevation of mechanism for carrying my invention into effect. Fig. 2 is a detail transverse vertical section of the same, and Fig. 3 is a plan of the device.

In a former application for Letters Patent, filed May 2, 1879, I have shown and described means for collecting river-mud or alluvial deposit and discharging the same in a manner whereby its distribution over low land may be advantageously effected; and this my present application relates to appliances for distributing the mud in an even and thorough manner over land requiring reclamation.

My former application contemplates the collection of the mud in a reservoir or basin, where it is deposited by scows or dredges, and whence it is drawn by an endless conveyer moving over an inclined plane and discharging over an earthwork, bank, or wall. My present application proposes the distribution of the mud thus discharged by means of another endless conveyer, located inside of the bank and moving over the surface of the land to be filled in, over which surface it spreads the discharged mud to any desired depth or extent and in every required direction.

Referring to the accompanying drawings, A indicates a chute, which receives the mud discharged, as already suggested, and causes it to be directed over an endless conveyer, B. Said conveyer consists of endless chains $b\ b$, with transverse paddles or scrapers $b'\ b'$, said chains moving on sprocket-wheels $c$ and $d$, made fast to shafts C and D, respectively. The shaft C is sustained in uprights $c'\ c'$, which are supported on a platform or frame-work, E, of any suitable construction, being preferably made of strong timbers securely bolted together, and adapted to receive and uphold a boiler, F, and engine F'. The shaft D has its bearings in the arms $g\ g$ of a yoke, G, which is swiveled on a center-post, H, so as to swing freeely around the same; and said shaft is provided with a cog-wheel, $d'$, which gears with another wheel, $i$, on a shaft, I, which is also sustained on the yoke G.

$i'$, $k$, $k'$, $l$, and $l'$ show other gear-wheels, whereby motion is communicated to the shaft M, so as to move the elevating-conveyer of my former application from the distributing-conveyer B of this application. For this purpose the shaft M, or one receiving motion therefrom, will be provided with sprocket-wheels carrying the endless chain, having lifting-buckets, and placed at a suitable incline.

The engine F' is geared with the shaft C, so as to give motion in the required direction to the conveyer B. The paddles or scrapers of said conveyer may be of any desired construction, and are shown in the drawings as strong plates or timbers, which are L-shaped in cross-section.

The outer edges of some of the scrapers should be serrated or provided with points or teeth, as shown at $b^2$ in the drawings, so as to act like harrow-teeth on any lumps which may be found in the discharged mud, disintegrating the same thoroughly, so as to insure proper distribution.

The operation is substantially as follows: The mud discharged from the chute falls between the chains $b\ b$ upon the ground beneath, and when it has accumulated sufficiently will come within the reach and action of the scrapers $b'$, which are at the same time moving in the direction indicated by the arrows. Said scrapers push the mud along before them and distribute the same over the ground. From time to time, as the filling in of portions of the tract sought to be reclaimed is effected, the conveyer B is moved so as to occupy a different radial line from the post H, around which it swings. This is effected by moving the platform E in a circle, or approximately to a circle, having as its center said post H, the yoke G being swiveled thereon, and therefore permitting the shaft D to always retain its parallelism with the shaft C, whatever may be the position of the platform E. The movement of said platform may be accomplished by any suitable means, preferably by the aid of rollers $e\ e$, on which said platform rests, and which are caused to roll by aid of hand-spikes. To take up any slack in the conveyer caused by an inexact location of the platform E, or resulting from other cause, the supports $c'$ of the shaft C should be swiveled on said platform and provided with an adjusting-brace, $c^2$, or rendered otherwise adjustable; and in lieu of the intermediate gear-wheels, $i\ i'\ k\ k'$, chain or other equivalent gearing may be employed.

What I claim as my invention is—

1. An endless-chain conveyer arranged to travel horizontally, or approximately so, and combined with a center-post, H, and platform E, and adapted to move around said post, so as to occupy different radial lines, and thereby to distribute over different portions of a tract mud discharged at one point thereon, the platform E being located at the extreme or sweeping end of the conveyer, as shown and described.

2. The combination of a discharging-chute, A, a swinging endless conveyer, B, a platform, E, and an engine, F', located on said platform.

3. The combination of engine F', endless conveyer B, shaft M, and intermediate gearing, substantially as described, whereby an elevating-conveyer may be moved from said engine through the medium of said distributing-conveyer and gearing, as set forth.

In testimony that I claim the foregoing I have hereunto set my hand this 13th day of June, 1879.

GEORGE HOWELL.

Witnesses:
AL. P. BURCHELL,
SAML. J. VAN STAVOREN.